United States Patent
Brendel

(10) Patent No.: US 9,915,181 B2
(45) Date of Patent: Mar. 13, 2018

(54) INTERNAL COMBUSTION ENGINE

(75) Inventor: Matthias Brendel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 84 days.

(21) Appl. No.: 14/127,113

(22) PCT Filed: Jun. 14, 2012

(86) PCT No.: PCT/EP2012/002508
§ 371 (c)(1),
(2), (4) Date: Dec. 17, 2013

(87) PCT Pub. No.: WO2012/175177
PCT Pub. Date: Dec. 27, 2012

(65) Prior Publication Data
US 2014/0137825 A1    May 22, 2014

(30) Foreign Application Priority Data

Jun. 18, 2011   (DE) .................. 10 2011 104 531

(51) Int. Cl.
| | | |
|---|---|---|
| *F01L 1/344* | (2006.01) | |
| *F16F 15/26* | (2006.01) | |
| *F02B 75/04* | (2006.01) | |

(52) U.S. Cl.
CPC ............ *F01L 1/344* (2013.01); *F02B 75/048* (2013.01); *F16F 15/264* (2013.01)

(58) Field of Classification Search
CPC ..... F01L 2001/34496; F01L 2001/3443; F01L 2001/34426; F01L 2001/34446;
(Continued)

(56) References Cited

U.S. PATENT DOCUMENTS

| | | |
|---|---|---|
| 5,092,293 A | 3/1992 | Kaniut |
| 6,390,035 B2 | 5/2002 | Moteki et al. |

(Continued)

FOREIGN PATENT DOCUMENTS

| | | |
|---|---|---|
| CN | 101052822 | 10/2007 |
| CN | 101153641 | 4/2008 |

(Continued)

OTHER PUBLICATIONS

International Search Report issued by the European Patent Office in International Application PCT/EP2012/002508 dated Nov. 20, 2013.

(Continued)

*Primary Examiner* — Mark Laurenzi
*Assistant Examiner* — Paul Thiede
(74) *Attorney, Agent, or Firm* — Henry M. Feiereisen LLC

(57) ABSTRACT

An internal combustion engine has a multi-link crankshaft drive with a plurality of coupling elements rotatably mounted on crankpins of a crankshaft and a plurality of articulated connecting rods rotatably mounted on crankpins of an eccentric shaft, wherein each of the coupling elements is pivotally connected to a piston connecting rod of a piston of the internal combustion engine and to one of the articulated connecting rods. A balance shaft, which is driven by a crankshaft via a phase adjuster, is provided in order to at least partially attenuate second-order inertia forces occurring in the internal combustion engine.

7 Claims, 4 Drawing Sheets

(58) Field of Classification Search
CPC ........... F01L 1/3442; F01L 2001/34433; F01L 2001/34493; F01L 1/344; F02B 75/048; F16F 15/264; F16F 15/265
USPC ........... 123/90.31, 48 B, 48 R, 90.48, 192.2, 123/90.17, 192.29
See application file for complete search history.

(56) References Cited

U.S. PATENT DOCUMENTS

| | | | |
|---|---|---|---|
| 6,604,495 B2* | 8/2003 | Moteki | 123/48 B |
| 6,684,828 B2* | 2/2004 | Ushijima et al. | 123/48 B |
| 7,905,210 B2* | 3/2011 | Eto | F02B 75/048 123/192.1 |
| 8,408,171 B2* | 4/2013 | Tanaka et al. | 123/48 R |
| 8,783,222 B2* | 7/2014 | Anton | F16F 15/265 123/192.2 |
| 2004/0149243 A1* | 8/2004 | Yamada et al. | 123/78 F |
| 2006/0102116 A1* | 5/2006 | Maezuru et al. | 123/78 E |
| 2006/0144354 A1* | 7/2006 | Tanaka et al. | 123/48 B |
| 2009/0000598 A1 | 1/2009 | Bach et al. | |
| 2009/0044772 A1* | 2/2009 | Purcilly | F01L 1/02 123/90.31 |
| 2010/0018504 A1* | 1/2010 | Tanaka et al. | 123/48 B |
| 2012/0285412 A1* | 11/2012 | Brendel | F02B 75/048 123/192.2 |

FOREIGN PATENT DOCUMENTS

| | | | |
|---|---|---|---|
| CN | 201475241 | 5/2010 | |
| DE | 35 22 988 | 6/1986 | |
| DE | 39 17 494 | 12/1990 | |
| DE | 601 21 487 | 11/2006 | |
| DE | 102005054760 | 5/2007 | |
| DE | L02005054761 | 5/2007 | |
| DE | 102008032665 | 1/2010 | |
| DE | 102009006633 | 8/2010 | |
| DE | 102010004589 A1 * | 7/2011 | ............ F02B 41/04 |
| EP | 1 126 144 | 8/2001 | |
| EP | 1 473 451 | 3/2004 | |
| EP | 1 659 276 | 5/2006 | |
| EP | 1 811 199 | 7/2007 | |
| EP | 1 950 390 | 7/2008 | |
| EP | 2 119 890 | 11/2009 | |
| FR | WO 2012110722 A1 * | 8/2012 | ............ F16F 15/265 |
| JP | H04-171341 | 6/1992 | |
| JP | 2006-207505 | 8/2006 | |
| JP | 2006-207635 | 8/2006 | |
| JP | 2009-236085 | 10/2009 | |
| WO | WO 2010/046741 | 4/2010 | |

OTHER PUBLICATIONS

Chinese Search Report dated Aug. 20, 2015 with respect to counterpart Chinese patent application 201280029998.7.
Translation of Chinese Search Report dated Aug. 20, 2015 with respect to counterpart Chinese patent application 201280029998.7.
Chinese Search Report dated Dec. 29, 2014 with respect to counterpart Chinese patent application 201280029998.7.
Translation of Chinese Search Report dated Dec. 29, 2014 with respect to counterpart Chinese patent application 201280029998.7.
Zhang Baocheng, Fan Wenxin, Yuan Xia, "The Balance Technology for Inline Four Cylinders Engine with Second Order Reciprocating Inertial Force" Jul. 31, 2005.

* cited by examiner

INTERNAL COMBUSTION ENGINE

CROSS-REFERENCES TO RELATED APPLICATIONS

This application is the U.S. National Stage of International Application No. PCT/EP2012/002508, filed Jun. 14, 2102, which designated the United States and has been published as International Publication No. WO 2012/175177 A2 and which claims the priority of German Patent Application, Serial No. 10 2011 104 531.0, filed Jun. 18, 2011, pursuant to 35 U.S.C. 119(a)-(d).

BACKGROUND OF THE INVENTION

The invention relates to an internal combustion engine having a multi-link crankshaft drive, wherein the multi-link crankshaft drive includes a plurality of coupling elements rotatably mounted on crankpins of a crankshaft and a plurality of articulated connecting rods rotatably mounted on crankpins of an eccentric shaft, wherein each of the coupling elements is pivotally connected to a piston connecting rod of a piston of the internal combustion engine and to one of the articulated connecting rods.

Internal combustion engines of the aforementioned type are known in the art. They include the eccentric shaft, which is coupled to the crankshaft via the multi-link crankshaft drive and is thus driven by the internal combustion engine or the crankshaft. The multi-link crankshaft drive has a number of coupling elements corresponding to the number of pistons of the internal combustion engine, which are each rotatably supported on the crankpin of the crankshaft and have two arms projecting on opposite sides of the crankshaft and having a pivoting joint at their end. One of the pivoting joints is used to pivotally connect with the piston connecting rod which connects one of the pistons of the internal combustion engine to the crank shaft via the coupling element. Another of the pivot joints is used to pivotally connect with the so-called articulated connecting rod which is supported with its other end rotatably on the crankpin of the eccentric shaft.

Similar to a conventional internal combustion engines without an eccentric shaft coupled to the crankshaft via a multi-link crankshaft drive, inertia forces of the first and second order are also generated in the internal combustion engines of the aforementioned type, which are caused by oscillating masses and which change with the crank angle of the crankshaft. To achieve a desired smooth running and to reduce noise, these inertial forces must be compensated as much as possible. While the first-order inertial forces can be compensated with counterweights on the crankshaft having a certain arrangement and a certain weight as well as with a certain crankshaft cranking sequence, the second order inertia forces are often compensated in conventional internal combustion engines by using two counter-rotating balance shafts, which are driven at twice the rotational speed of the crankshaft.

More specifically, the oscillating masses cause in all internal combustion engines free first-order and second-order inertia forces that vary with the crank angle of the crankshaft. While first-order inertia forces are balanced by the counterweights on the crankshaft and the crankshaft cranking sequence, the free second-order inertia forces cannot be fully compensated in conventional internal combustion engines having a multi-link crankshaft drive. For this reason, such internal combustion engines are inferior with regard to the smoothness or refinement of internal combustion engines lacking a multi-link crankshaft drive where second order inertia forces are often the compensated by using the two counter-rotating balance shafts. However, this measure cannot be easily transferred to internal combustion engines having a multi-link crankshaft drive, because the resulting inertia forces are, on the one hand, not purely oscillatory, but rather are rotational, and on the other, the friction losses of the multi-link crankshaft drive itself are already higher than the friction losses of conventional internal combustion engines and would increase to an unacceptable level because of the additional frictional losses of an additional balance shaft. However, even in internal combustion engines of the aforementioned type, a far-reaching compensation of the inertial forces can be attained with specific designs of the balance shaft.

Once the forces of inertia of the engine are almost balanced, the mass torques around the crankshaft axis, i.e. in the longitudinal direction of the internal combustion engine, greatly affect the engine acoustics. A total alternating torque $M_w$ of the internal combustion engine about the longitudinal crankshaft axis is essentially composed of a gas exchange torque $M_{GW}$, the mass alternating torque $M_{MW}$ and the balancing torque $M_A$. In a four-cylinder in-line combustion engine all these components operate in the second order. The gas exchange torque is hereby produced by the gas forces tangentially introduced into the crankshaft and is thus the reaction torque, which is produced on the crankshaft when the internal combustion engine outputs a net torque. The mass alternating torque is generated by the support of the inertia forces of the multi-link crank drive on the crankshaft. The balancing torque in conventional multi-link crankshaft drives results from the vertical offset, which is present between two optional balance shafts. By selective design of this height offset, the total alternating torque can be reduced in certain operating ranges, i.e. speed and/or load ranges, thus improving the engine acoustics.

The multi-link crankshaft drive is preferably configured to have a second-order inertia force loop resembling a circle. The inertia force loop can be divided into a part rotating in the direction of rotation of crankshaft and a counter-rotating part. When the multi-link crankshaft drive has the circle-like second-order inertia force loop, at least the more dominant of the two parts, namely the part rotating in the direction of rotation of crankshaft can be compensated with only a single balance shaft that rotates at twice the rotational speed of the crankshaft. The usually considerably smaller, counter-rotating second order inertia force part which rotates in the opposite direction as the crankshaft inertia component could also be fully compensated by a second balance shaft. However, this inertia force part typically has a smaller inertia force amplitude in the second order than a mechanical valve train. Therefore, the second balance shaft can often be eliminated.

SUMMARY OF THE INVENTION

It is the object of the invention to provide an internal combustion engine, which further improves the engine acoustics in a cost effective manner and with low friction.

This is achieved according to the invention with an internal combustion engine having a balance shaft driven by the crankshaft via a phase adjuster which is configured to at least partially eliminate the second order inertia forces generated by the internal combustion engine. When the multi-link crankshaft drive or the internal combustion engine is equipped with the balance shaft, the absolute position or the phase position of this balance shaft with respect to the crankshaft position determines the generation and expression of a compensation torque of this balance shaft. The compensation torque counteracts the gas exchange torque analogously to the above-described height offset of the plurality of balance shafts known from the conventional internal combustion engines and thus contributes in specific operating ranges of the internal combustion engine to an improved acoustics. Especially with well-balanced inertia forces, the gas exchange torque gains a strong influence on the acoustics, especially the interior noise level, and must therefore be minimized by a suitably designed balancing torque in at least a certain operating range.

For this purpose, the phase adjuster is provided, with which an angular offset between the crankshaft and the balance shaft can be changed in a predetermined angular range. For example, the angular offset can be adjusted depending on the operating point of the internal combustion engine so that the acceleration on the motor bearings of the internal combustion engine is minimized in each case and the acoustics of the internal combustion engine is significantly improved as a result. With a favorable choice of the angular offset between the crankshaft and balance shaft, the acceleration in the lateral direction of the internal combustion engine on a left of the motor bearings and on a right of the motor bearings can overall cause destructive interference. This results in an added lateral acceleration via the two engine bearings which is considerably smaller than the acceleration on the motor bearings themselves. By changing the angular offset between the crankshaft and the balance shaft, the phase of the accelerations on the left and right engine bearings can be changed in the internal combustion engine according to the invention. In order to maximize this destructive interference, i.e. the compensation effect, in different operating points, i.e. at different speeds and loads, the angular offset of the balance shaft must in particularly be continuously adjusted. This is possible by using the phase adjuster. A similar effect can hence be achieved by using the phase adjuster as with a variable height offset between multiple balance shafts, which cannot be realized in practice.

The balance shaft of the internal combustion engine according to the invention is designed to at least partially eliminate the second-order inertia forces produced in the internal combustion engine, namely in particular a large part of the inertia force component rotating in the direction of the crankshaft. While the second order inertia forces in prior art internal combustion engines act only in the direction of the cylinder axes, which in inline internal combustion engines corresponds to the vertical axis, the internal combustion engine, in particular the inline internal combustion engine of the aforementioned type having the multi-link crankshaft drive, has second-order inertia forces not only in the direction of the vertical axis (first force vector), but also in the direction of a perpendicular transverse axis of the internal combustion engine (second force vector). The respective resultant of these two force vectors has an amplitude that varies in the course of one revolution of the crankshaft and can be represented by a closed curve extending in an imaginary plane of the internal combustion engine perpendicular to the axis of rotation of the crankshaft over one rotation of the crankshaft. Depending on the arrangement and dimensions of the components of the multi-link crankshaft drive, this curve can assume either an elongated loop-like shape or a more roundish elliptical or oval to nearly circular shape. Since the second-order inertia forces could be completely eliminated with an exactly circular shape of the curve by using a single balance shaft, a curve shape is desired through optimization of the design of the components of the multi-link crankshaft drive and the dimensions or kinematics of multi-link crankshaft drive which approximates a circle as closely as possible or deviates as little as possible from a circular shape, wherein the force vectors are also as small as possible.

According to another embodiment of the invention, only a single balance shaft is provided. It is known in the prior art to use several balance shafts for essentially completely eliminating the second-order inertia forces. However, each additional balance shaft introduces higher friction losses compared to an internal combustion engine which has only a single balance shaft. The friction can thus be kept below a certain level. In addition, the installation space, the weight and the cost of the internal combustion engine can be reduced by employing only a single balance shaft.

According to another embodiment of the internal combustion engine, the phase adjuster has an adjustment range of less than or equal to 45°, preferably 20°. The adjustment range reflects the angular range, over which the angular offset between the crankshaft and balance shaft is adjustable. Thus, the adjustment range is between a first maximum angular offset in a first direction of rotation and a second maximum angular offset in a second direction of rotation opposite the first direction of rotation. The difference between the second and the first angular offset thus represents the adjustment range. This adjustment range should be less than or equal to 45°, in particular less than or equal to 20°, preferably exactly 20°.

According to another embodiment of the invention, the phase adjuster is configured to adjust an angular offset between the crankshaft and balance shaft such that a gas exchange torque of the internal combustion engine is at least partially, in particular completely compensated under every load condition. As already mentioned above, the total alternating torque is composed of the gas exchange torque, the mass alternating torque and the balancing torque, all of which act in the second order. In particular, the reduction of the gas exchange torque significantly improves the acoustics of the internal combustion engine because it affects the acoustics particularly well when the inertia forces are compensated. It is therefore advantageous to minimize and preferably completely compensate the gas exchange torque by a suitably designed balancing torque which can be generated with the balance shaft or by adjusting the angular offset. The phase adjuster now serves to adjust the angular offset so as to reduce and preferably minimize or completely compensate the gas exchange torque.

According to another embodiment of the invention, a control device is provided for adjusting the phase adjuster as a function of an operating point of the internal combustion engine. The operating point of the internal combustion engine describes in particular the load acting on the engine and/or its rotational speed. Different inertia forces occur at different operating points. It is thus advantageous to control and/or regulate the phase adjuster as a function of the operating point such that the angular offset between the crankshaft and the balance shaft can be adjusted as a function of the respective operating point. Thus, for example, a first phase offset occurs at a first operating point, and a second phase offset occurs at a second operating point, and so on.

According to another embodiment of the invention, the balance shaft has the same direction of rotation as the crankshaft. Experiments have shown that residual second-order inertia forces that are not eliminated can have different magnitudes depending on the direction of rotation of the balance shaft. In the internal combustion engine of the present example, the balance shaft rotates with a direction of rotation that corresponds to the direction of rotation of the crankshaft. The remaining second order-inertia forces that are not eliminated are here considerably smaller than when the balance shaft rotates in the opposite direction.

According to another embodiment of the invention, the balance shaft is driven by the crankshaft via a balance shaft gear, wherein the balance shaft gear has a gear ratio wherein the balance shaft rotates at twice the rotational speed of the crankshaft. Due to the doubling of the speed, second-order inertia forces can be compensated with the balance shaft. For this reason, the balance shaft is advantageously driven directly by the crankshaft, wherein the balance shaft gear serves to realize the rotational speed conversion from the speed of the crankshaft to twice the speed of the crankshaft.

According to another embodiment of the invention, the eccentric shaft is driven by the crankshaft via an eccentric shaft gear, wherein the eccentric shaft gear has a gear ratio, wherein the eccentric shaft rotates at half the rotational speed of the crankshaft. The eccentric shaft is thus also driven by the crankshaft. For this purpose, the eccentric shaft gear is provided between the eccentric shaft and the crankshaft. However, the eccentric shaft is to rotate only at half the speed of the crankshaft. Advantageously, the eccentric shaft and the balance shaft can be driven by the crankshaft via a common gear or belt drive, but with the different step-down or step-up ratios. However, separate gear or belt drives may also be used for driving the balance shaft and the eccentric shaft.

According to another embodiment of the invention, the eccentric shaft has a direction of rotation that is opposite to the direction of rotation of the crankshaft. With such an embodiment, an extended expansion of the internal combustion engine can be realized.

According to another embodiment of the invention, an additional phase adjuster is provided between the crankshaft and the eccentric shaft for adjusting an angular offset between the crankshaft and the eccentric shaft. In this way, an internal combustion engine can now be realized that exhibits smooth running due to the phase-adjustable balance shaft. In addition, the stroke of the piston of the internal combustion engine can additionally be adjustable. In particular, the stroke of the piston stroke should be greater during the expansion and exhaust stroke than during the intake and compression stroke. However, this stroke can be substantially freely selected within a certain angular range by using the phase adjuster arranged between the crankshaft and the eccentric shaft. Preferably, the phase adjuster is here also controlled and/or regulated as a function of the operating point of the internal combustion engine. For example, the same control device can be used to control and/or regulate the phase adjuster between the crankshaft and the eccentric shaft that also controls and/or regulates the phase adjuster between the crankshaft and the balance shaft. The angular offset between the crankshaft and the eccentric shaft can then be selected both as a function of the operating point as well as of the angular offset between the crankshaft and the balance shaft, and vice versa.

BRIEF DESCRIPTION OF THE DRAWING

The invention will now be explained in more detail below with reference to exemplary embodiments illustrated in the drawing, without limiting the scope of the invention. The drawings show in.

DETAILED DESCRIPTION OF PREFERRED EMBODIMENTS

Figure 1:
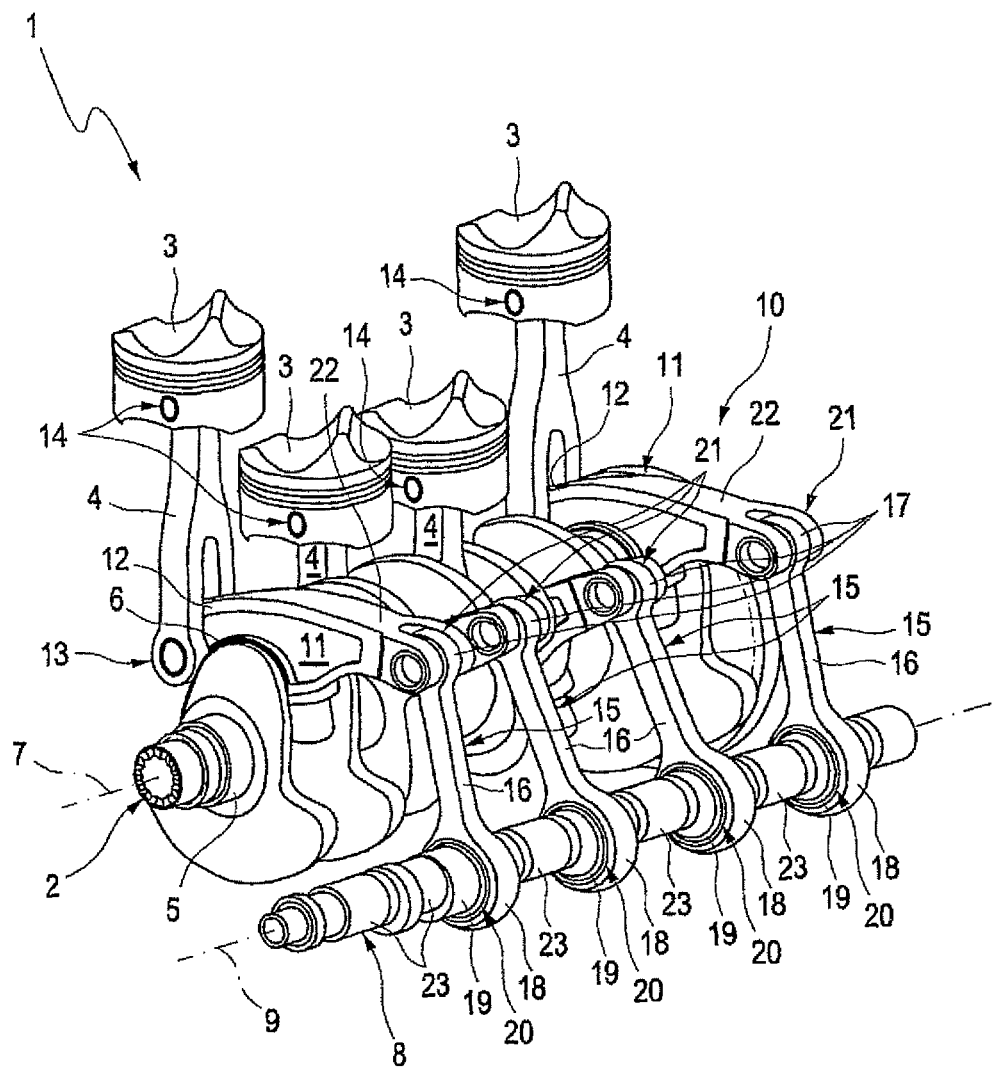
FIG. 1 a perspective view of a portion of an internal combustion engine.

FIG. 1 shows a perspective view of a portion of an internal combustion engine 1, which is constructed as an in-line internal combustion engine, more precisely as a four-cycle four-cylinder in-line internal combustion engine. The internal combustion engine 1 has a crankshaft 2 and four pistons 3, each of which is movably supported in one of unillustrated four cylinders of the internal combustion engine 1. Each of the four pistons 3 is connected with the crankshaft 2 via a piston connecting rod 4. The crankshaft 2 is rotatably mounted in unillustrated shaft bearings of an unillustrated cylinder crankcase of the internal combustion engine 1, and has five centric shaft journals 5 serving as support, and four crankpins 6 (only one of which is visible in FIG. 1 in each case), whose central longitudinal axes are offset at different angular orientations parallel to a rotational axis 7 of the crankshaft 2.

The internal combustion engine 1 furthermore includes an eccentric shaft 8 having an axis of rotation 9 that is parallel to the axis of rotation 7 of the crankshaft 2. The eccentric shaft 8 is rotatably mounted in the cylinder crankcase adjacent to and slightly below the crankshaft 2 and is coupled to the crankshaft 2 via a multi-link crankshaft drive 10. In addition to the crankshaft 2 and the eccentric shaft 8, the multi-link crankshaft drive 10 includes a total of four coupling elements 11 which are each rotatably supported on one of the crankpin 6 of the crankshaft 2. Each of the coupling elements 11 includes a lift arm 12, which is pivotally connected via a swivel joint 13 to a lower end of one of the piston connecting rods 4. An upper end of the respective piston connecting rod 4 is articulated on the respective piston 3 via an additional pivot joint 14.

The multi-link crankshaft drive 10 further includes a plurality of articulated connecting rods 15 corresponding number of piston connecting rods 4 and the coupling elements 11. The articulated connecting rods 15 are oriented approximately parallel to the piston connecting rods 4 and are each arranged in the axial direction of the crankshaft 2 and of the eccentric shaft 8 in approximately the same plane as the associated piston connecting rod 4, however on the opposite side of the crankshaft 2. Each articulated connecting rod 15 includes a connecting rod 16 and two connecting rod eyes 17 and 18 disposed at opposite ends of the connecting rod 16, in particular with different inner diameters. The larger connecting rod eye 18 of each articulated connecting rod 15 at the lower end of connecting rod 16 surrounds an crankpin 19 which is eccentric with respect to the axis of rotation 9 of the eccentric shaft 8 and on which the articulated connecting rod 15 is rotatably supported by a rotational bearing 20. The smaller connecting rod eye 17 at the upper end of the connecting rod 6 of each articulated connecting rod 15 forms part of a pivot joint 21 between the articulated connecting rod 15 and a longer link arm 22 of the adjacent coupling element 11, which protrudes over the crankshaft 2 on the side of the crankshaft 2 opposite the lift arm 12.

The eccentric shaft 8 has shaft sections 23 which arranged between adjacent eccentric crankpins 19 and coaxial with the axis of rotation 9 for supporting the eccentric shaft 8 in shaft bearings. With the above-described arrangement, not only can the compression be changed, but the inclination of the piston connecting rods 4 relative the cylinder axis of the associated cylinders can be reduced during the rotation of the crankshaft 2, which reduces the lateral piston forces and therefore the friction forces between the piston 2 and the cylinder walls of the cylinders.

Figure 2:
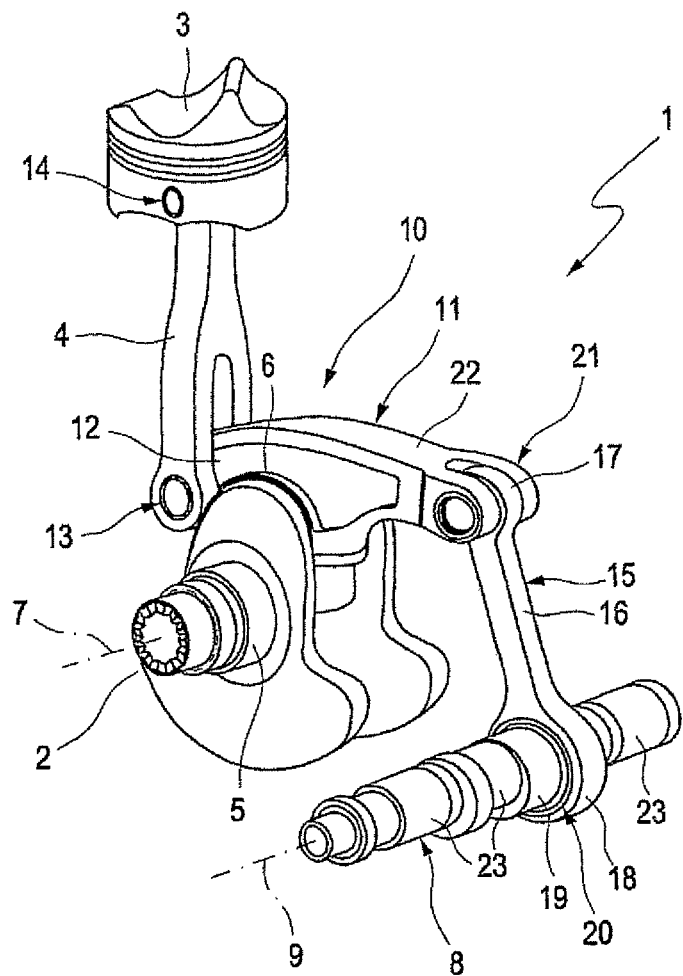
FIG. 2 a perspective view of a portion of the internal combustion engine shown in FIG. 1, FIG. 3 a partially sectioned end view of the detail shown in FIG. 2, and FIG. 4 a block diagram showing the relationship and operation of components of the internal combustion engine.

FIG. 2 shows a perspective view of a section of the internal combustion engine 1 illustrated in FIG. 1. The design of the internal combustion engine 1 corresponds to the already described internal combustion engine, so that reference is made to the earlier description.

Figure 3:
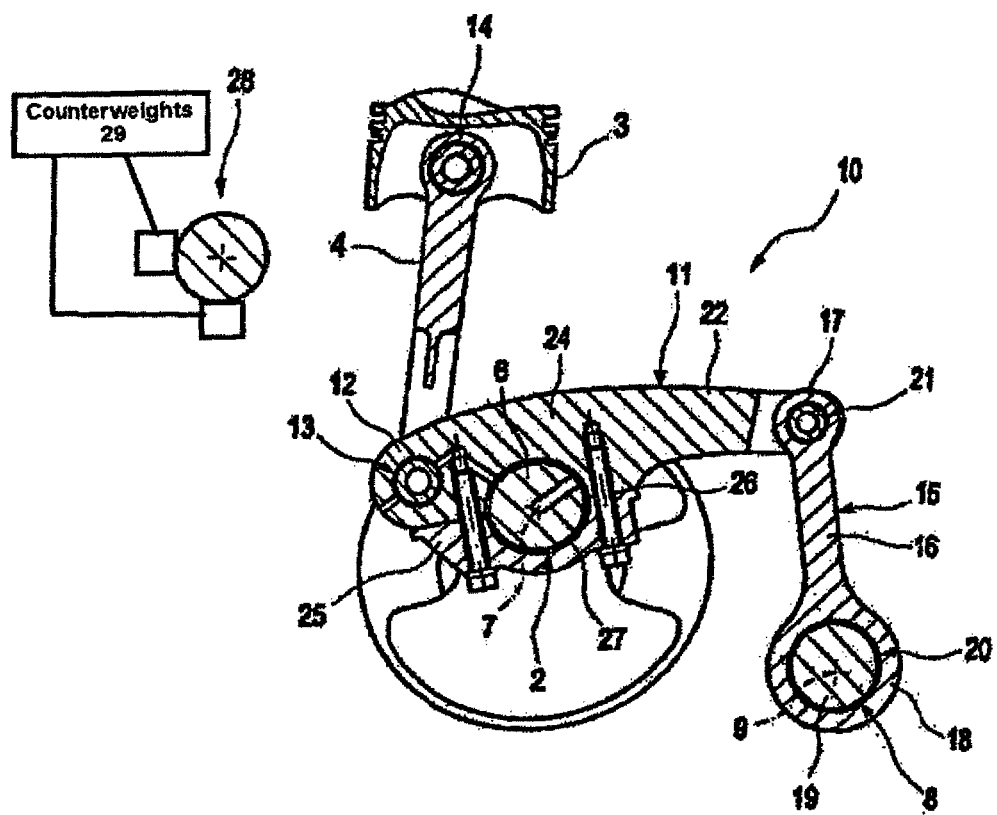

FIG. 3 shows a partially sectioned end view of the section shown in the FIG. 2. It is readily apparent that the illustrated coupling element 11 is composed of an upper part 24 and a lower part 25, wherein the upper part 24 and the lower part 25 abut against each other along a parting plane 26 and are each provided adjacent to the parting plane 26 with a semi-cylindrical recess for receiving the crankpin 6 as well as with two bearing shells surrounding the crankpin 6 of a sliding bearing 27 arranged between the crankpin 6 and the coupling element 11. The top part 24 and bottom part 25 of each coupling element 11 are held together by two screws.

Figure 4:
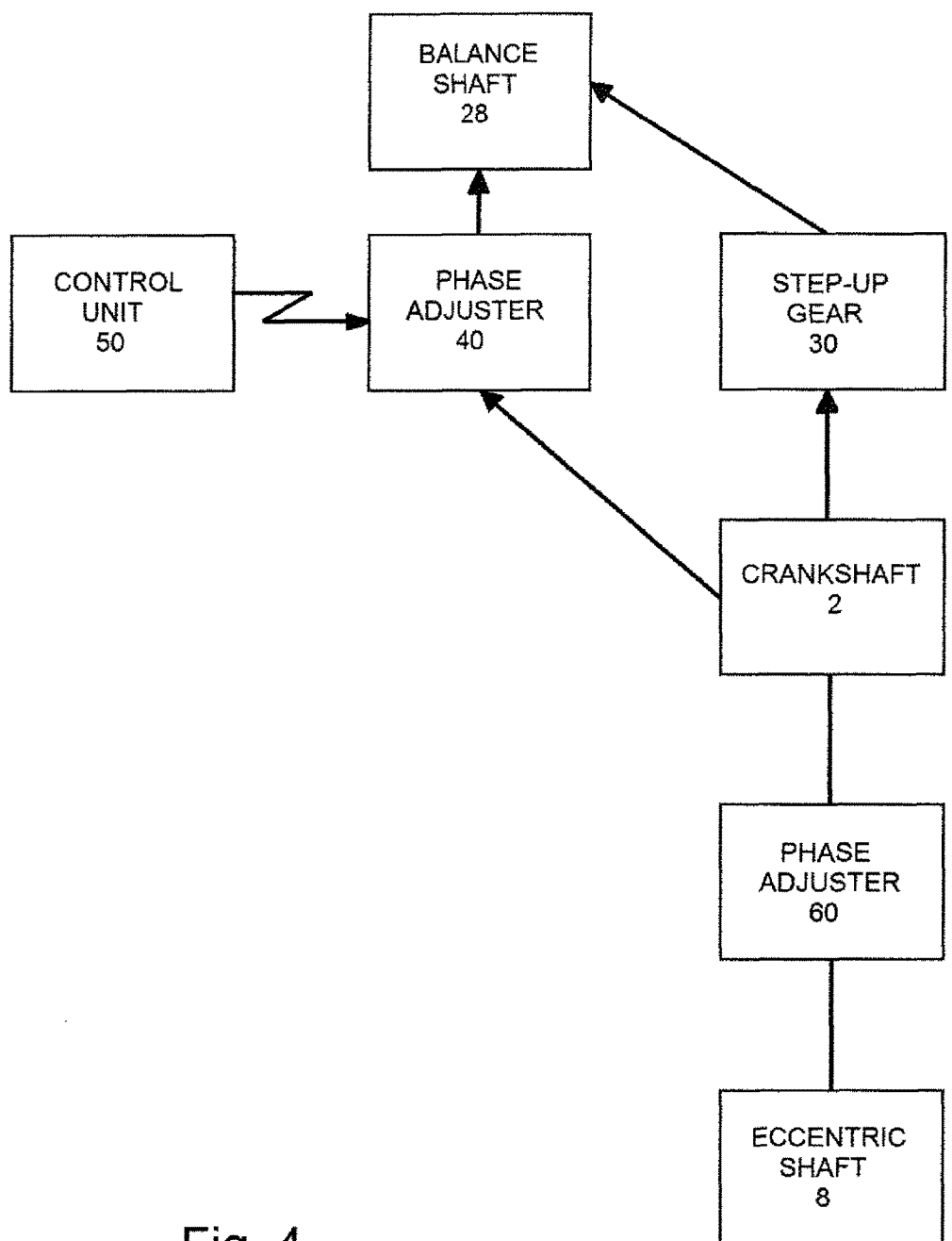

As with other internal combustion engines, the internal combustion engine 1 presented here also exhibits free inertial forces caused by the oscillating masses of the piston 3, the piston connecting rods 4, the coupling elements 11 and the articulated connecting rods 15, which should be compensated as much as possible to improve the smoothness and to acoustics of the internal combustion engine 1. These free inertia forces include primarily first-order inertial forces and second-order inertia forces. The former can be compensated by unillustrated counterweights on the crankshaft 2 and by its cranking sequence. The second-order inertia forces are eliminated by using a balance shaft 28 provided with counterweights 29. As shown in FIG. 4, which is a block diagram showing the relationship and operation of components of the internal combustion engine 1, the balance shaft 28 is, for example, rotatably mounted in the cylinder crankcase of the internal combustion engine 1 above and laterally offset from the crankshaft 2, and is driven by the crankshaft 2 via a step-up gear 30 at twice the rotational speed of the crankshaft 2 and with a direction of rotation corresponding the direction of rotation of the crankshaft 2.

A phase adjuster 40 via which the crankshaft 2 drives the balance shaft 28 is arranged between the crankshaft 2 and the balance shaft 28. The phase adjuster 40 can be used to adjust an angular offset between the crankshaft 2 and balance shaft 28. This is in particular done through control and/or regulation wherein a second-order mass torque, in particular a gas exchange torque of the internal combustion engine 1, is compensated at least partially, preferably completely. For this purpose, the phase adjuster 40 has, for example, an adjustment range of 20°. However, another adjustment range, for example between 0° and 45° can also be realized. More particularly, in the internal combustion engine 1 has only a single balance shaft 28. The balance shaft 28 is hereby configured to at least partially eliminate second-order inertia forces generated in the internal combustion engine 1. The phase adjuster 40 is preferably adjusted under control/regulation by a control unit 50 which is configured to select any angular offset between the crankshaft 2 and balance shaft 28. This is preferably done as a function of an operating point of the internal combustion engine 1. In a particularly advantageous embodiment, an additional phase adjuster 60 may be provided between the crankshaft 2 and the eccentric shaft 8 for adjusting an angular offset therebetween.

What is claimed is:

1. An internal combustion engine comprising:
   a crankshaft having crankpins,
   an eccentric shaft having crankpins,
   a multi-link crankshaft drive comprising a plurality of coupling elements rotatably mounted on the crankpins of the crankshaft and a plurality of articulated connecting rods rotatably mounted on the crankpins of the eccentric shaft, each of the coupling elements being pivotally connected to a piston connecting rod of a piston of the internal combustion engine and to one of the articulated connecting rods,
   a single balance shaft, and
   a phase adjuster, the single balance shaft being driven by the crankshaft via the phase adjuster and the phase adjuster adjusting a location of the single balance shaft relative to the crankshaft during operation of the internal combustion engine so that
   second-order inertia forces generated in the internal combustion engine in directions along a vertical axis and a transverse axis of the internal combustion engine during the operation of the internal combustion engine, are at least partially eliminated.

2. The internal combustion engine of claim 1, wherein the adjusted location has an angular offset relative to the crankshaft.

3. The internal combustion engine of claim 1, further comprising a control unit that operatively controls the phase adjuster so that the phase adjuster moves the single balance shaft to the adjusted location.

4. The internal combustion engine of claim 1, wherein the single balance shaft rotates in a same direction of rotation as the crankshaft.

5. The internal combustion engine of claim 1, further comprising an eccentric shaft gear constructed to drive the eccentric shaft by the crankshaft, wherein the eccentric shaft gear has a gear ratio such that the eccentric shaft rotates at half a rotational speed of the crankshaft.

6. The internal combustion engine of claim 1, wherein the eccentric shaft has a direction of rotation opposite to a direction of rotation of the crankshaft.

7. The internal combustion engine of claim 1, further comprising an additional phase adjuster for adjusting a location of the eccentric shaft relative to the crankshaft during the operation of the internal combustion engine.

* * * * *